United States Patent
Balsiger et al.

(10) Patent No.: US 10,400,878 B2
(45) Date of Patent: Sep. 3, 2019

(54) COMPOUND HARMONIC DRIVE ASSEMBLY

(71) Applicant: Hamilton Sundstrand Corporation, Windsor Locks, CT (US)

(72) Inventors: Derick S. Balsiger, Mayer, AZ (US); Nicholas R. Van De Veire, Tempe, AZ (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 301 days.

(21) Appl. No.: 15/298,656

(22) Filed: Oct. 20, 2016

(65) Prior Publication Data

US 2018/0112760 A1    Apr. 26, 2018

(51) Int. Cl.
    *F16H 49/00*    (2006.01)
    *B64C 13/38*    (2006.01)
    *B64C 13/34*    (2006.01)

(52) U.S. Cl.
    CPC .......... *F16H 49/001* (2013.01); *B64C 13/34* (2013.01); *B64C 13/38* (2013.01); *Y02T 50/44* (2013.01)

(58) Field of Classification Search
    CPC ..................................... F16H 49/001
    USPC ........................................... 74/640
    See application file for complete search history.

(56) References Cited

U.S. PATENT DOCUMENTS

| | | | | |
|---|---|---|---|---|
| 3,172,299 | A | * | 3/1965 | Musser ............... B62D 3/02 74/388 PS |
| 3,555,929 | A | * | 1/1971 | Hossfeld ........... F16H 49/001 74/640 |
| 4,601,216 | A | | 7/1986 | Inoue et al. |
| 8,485,064 | B2 | * | 7/2013 | Kanai ............... F16H 49/001 74/640 |
| 2015/0049975 | A1 | | 2/2015 | Lee |
| 2015/0075310 | A1 | | 3/2015 | Lunin et al. |
| 2015/0354686 | A1 | | 12/2015 | Balsiger |
| 2016/0010738 | A1 | | 1/2016 | Balsiger et al. |

FOREIGN PATENT DOCUMENTS

EP    2574745 A1    4/2013

OTHER PUBLICATIONS

Partial European Search Report for European Patent Application No. 17186845.8 dated Mar. 7, 2018, 12 pages.
European Search Report from the European Patent Office for EP Application No. 17186845.8 dated Aug. 13, 2018, 13 pages.

* cited by examiner

*Primary Examiner* — Ha Dinh Ho
(74) *Attorney, Agent, or Firm* — Cantor Colburn LLP

(57) ABSTRACT

A compound harmonic drive assembly includes a ring gear assembly, a wave generator, a flex spline, and a rolling element. The wave generator is received within the ring gear assembly along the rotational axis. The wave generator has a body that extends radially between an exterior surface and an interior surface. The body defines at least one groove that extends radially from the exterior surface towards the interior surface. The flex spline is disposed between the ring gear assembly and the wave generator. The rolling element is disposed between the wave generator and the flex spline.

14 Claims, 4 Drawing Sheets

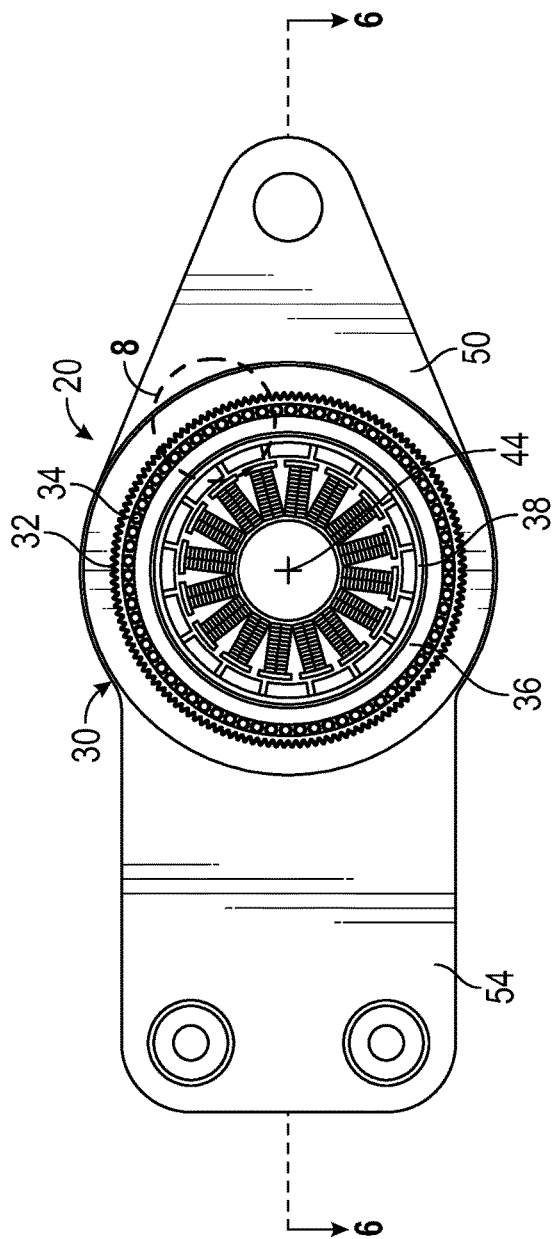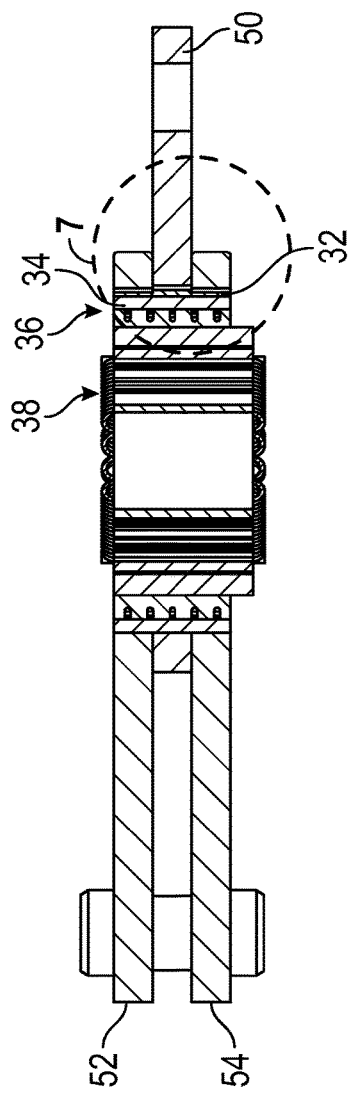
FIG. 5
FIG. 6

COMPOUND HARMONIC DRIVE ASSEMBLY

STATEMENT OF FEDERAL SUPPORT

This invention was made with Government support under FA8650-15-C-2500 awarded by United States Air Force. The Government has certain rights in the invention.

BACKGROUND

Compound harmonic drive gears are components of actuators that are able to improve upon certain characteristics of traditional gearing systems. Compound harmonic drive gears are small, high power density, high gear ration systems that operate at high velocities. High inertia of the high speed side of the compound harmonic drive gear may negatively affect the responsiveness of the harmonic drive gear.

BRIEF DESCRIPTION

According to an embodiment of the present disclosure, a compound harmonic drive assembly is provided. The compound harmonic drive assembly includes a ring gear assembly, a wave generator, a flex spline, and a rolling element. The ring gear assembly has a plurality of teeth extending radially inward towards a rotational axis. The wave generator is received within the ring gear assembly along the rotational axis. The wave generator has a body that extends radially between an exterior surface and an interior surface. The wave generator has a body that extends axially between a first face and a second face. The body defines at least one groove that extends radially from the exterior surface towards the interior surface. The flex spline is disposed between the ring gear assembly and the wave generator. The flex spline includes a plurality of meshing teeth that are configured to engage the plurality of teeth. The rolling element is disposed between the wave generator and the flex spline.

According to another embodiment of the present disclosure, a compound harmonic drive assembly is provided. The compound harmonic drive assembly includes a ring gear assembly, a wave generator, and a motor. The ring gear assembly includes an output arm, a first ground arm, and a second ground arm. The output arm defines a first opening that is disposed about a rotational axis and has a first plurality of teeth. The first ground arm that abuts a first side of the output arm. The first ground arm defines a second opening that is disposed about the rotational axis and has a second plurality of teeth. The second ground arm abuts a second side of the output arm. The second ground arm defines a third opening that is disposed about the rotational axis and has a third plurality of teeth. The wave generator is received within the first opening, the second opening, and the third opening along the rotational axis. The wave generator has a body that extends radially between an exterior surface and an interior surface and that extends axially between a first face and a second face. The body defines at least one groove that extends radially from an exterior surface towards an interior surface and is disposed between the first face and the second face. The motor is arranged to drivably engage the interior surface of the wave generator.

BRIEF DESCRIPTION OF THE DRAWINGS

The following descriptions should not be considered limiting in any way. With reference to the accompanying drawings, like elements are numbered alike:

FIG. 5 is a perspective view of the compound harmonic drive assembly'

FIG. 6 is a side elevation view of the compound harmonic drive assembly;

DETAILED DESCRIPTION

A detailed description of one or more embodiments of the disclosed apparatus is presented herein by way of exemplification and not limitation with reference to the Figures.

Figures 1, 2:
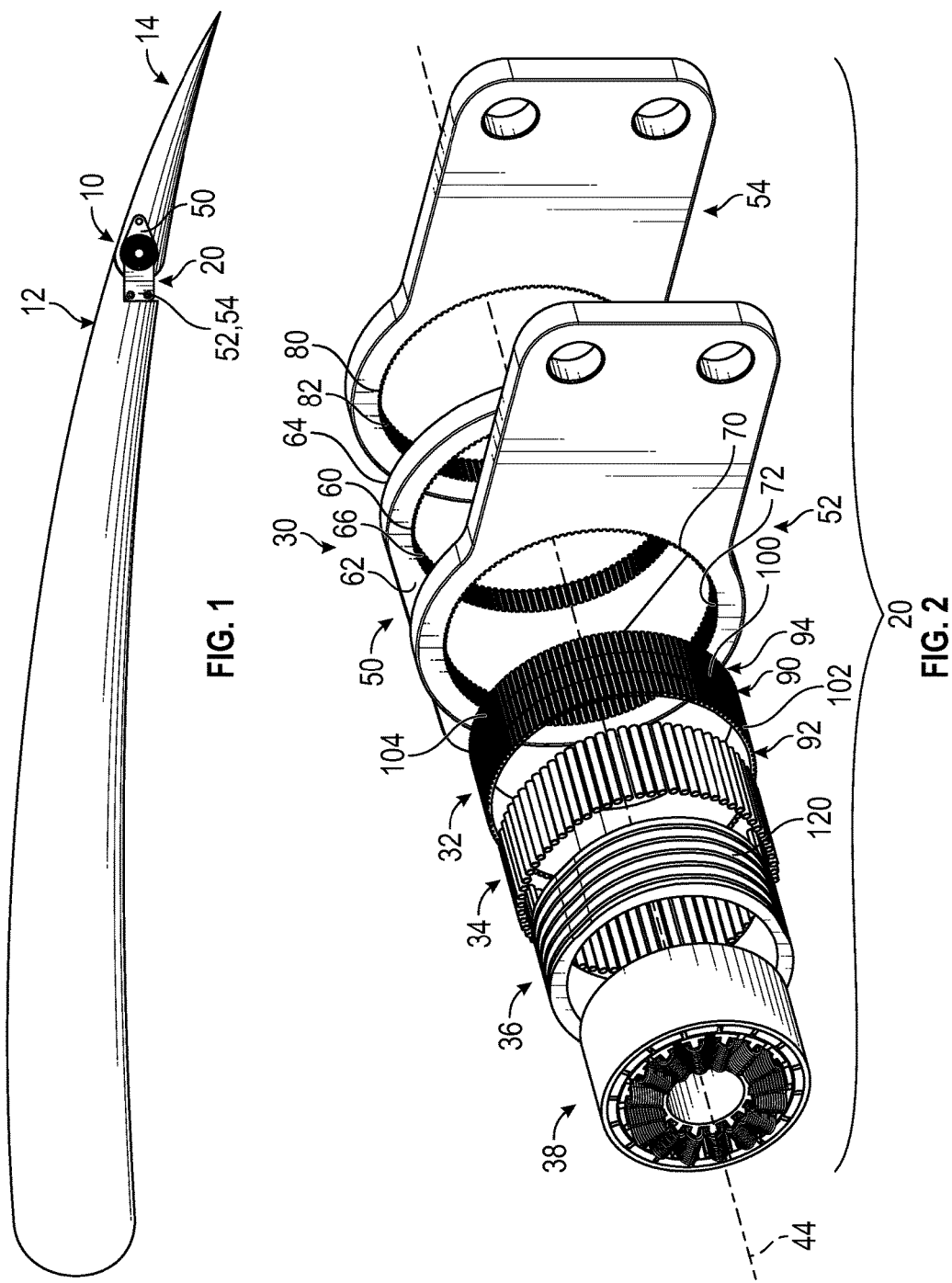
FIG. 1 is a side view of a flight control system having a compound harmonic drive assembly.
FIG. 2 is a disassembled view of the compound harmonic drive assembly.

Referring to FIG. 1, a portion of a flight control system 10 of an aircraft or a rotorcraft is shown. The flight control system 10 may include a wing or a rotor 12 and a movable control surface 14. A compound harmonic drive assembly 20 is operatively coupled to the wing or rotor 12 and the movable control surface 14 to actuate the movable control surface 14. The compound harmonic drive assembly 20 may be applied anywhere a high torque, low speed actuator would be desired to move a component or a control surface. Referring to FIG. 2, the compound harmonic drive assembly 20 includes a ring gear assembly 30, a flex spline 32, a rolling element 34, a wave generator 36, and a motor 38.

Referring to FIGS. 2, 5, 6, and 7, the ring gear assembly 30 is disposed about a rotational axis 44. The ring gear assembly 30 includes an output arm 50, a first ground arm 52, and a second ground arm 54. The output arm 50 extends in a first direction that is substantially perpendicular or transverse to the rotational axis 44. The output arm 50 defines a first opening 60 that extends from a first side 62 of the output arm 50 to a second side 64 of the output arm 50. The first opening 60 has a first plurality of teeth 66 that extend about the first opening 60 and extend radially inward towards the rotational axis 44.

The first ground arm 52 extends in a second direction that is disposed opposite the first direction. The first ground arm 52 is disposed adjacent to and abuts the first side 62 of the output arm 50. The first ground arm 52 defines a second opening 70 that extends completely through the first ground arm 52. The second opening 70 is disposed substantially co-linear or coaxially with the first opening 60 along the rotational axis 44. The second opening 70 has a second plurality of teeth 72 that extend about the second opening 70 and extend radially inward towards the rotational axis 44. The second plurality of teeth 72 are radially offset and axially spaced apart from the first plurality of teeth 66.

The second ground arm 54 is disposed substantially parallel to the first ground arm 52. The second ground arm 54 extends in the second direction that is disposed opposite the first direction. The second ground arm 54 is disposed adjacent to and abuts the second side 64 of the output arm 50. The second ground arm 54 defines a third opening 80 that extends completely through the second ground arm 54. The third opening 80 is disposed substantially co-linear or coaxially with the first opening 60 and the second opening 70 along the rotational axis 44. The third opening 80 has a third plurality of teeth 82 that extend about the third opening 80 and extend radially inward towards the rotational axis 44. The third plurality of teeth 82 are radially offset and axially spaced apart from the first plurality of teeth 66.

The flex spline 32 is radially disposed between the ring gear assembly 30 and the rolling element 34. The flex spline 32 is axially received within the first opening 60 of the output arm 50, the second opening 70 of the first ground arm 52, and the third opening 80 of the second ground arm 54 of the ring gear assembly 30. The flex spline 32 includes a first portion 90, a second portion 92, and a third portion 94. The flex spline 32 may be configured as a unitary component or may be configured as distinct segments that are joined together or disposed on top and/or adjacent to each other.

The first portion 90 is axially disposed between the second portion 92 and the third portion 94. The first portion 90 may be radially offset from the second portion 92 and the third portion 94 such that the first portion 90 is disposed further from the rotational axis 44. The first portion 90 has a first plurality of meshing teeth 100 that are configured to meshingly engage the first plurality of teeth 66 of the output arm 50 of the ring gear assembly 30.

The second portion 92 has a second plurality of meshing teeth 102 that are configured to meshingly engage the second plurality of teeth 72 of the first ground arm 52.

The third portion 194 has a third plurality of meshing teeth 104 that are configured to meshingly the engage the third plurality of teeth 82 of the second ground arm 54.

Figure 4:
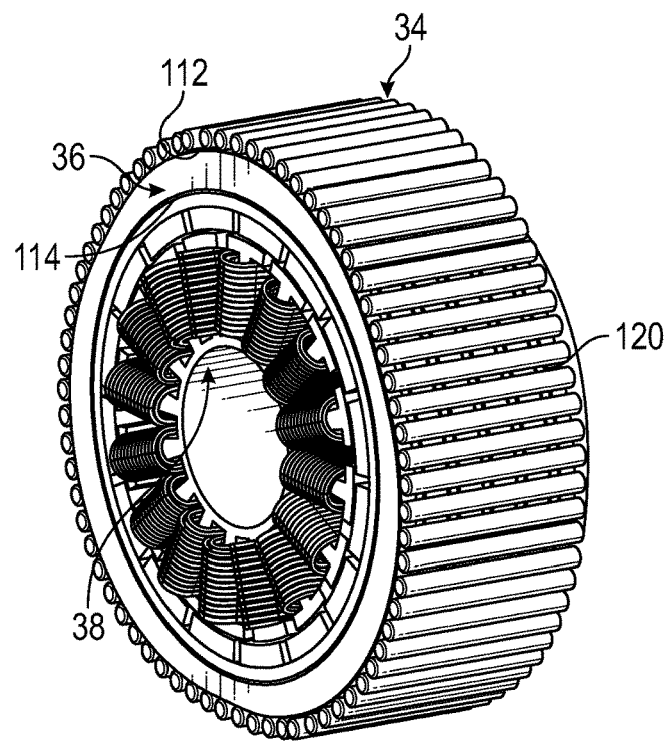
FIG. 4 is a perspective view of an assembly including a motor, the wave generator, and a rolling element.

The rolling element 34 is radially disposed between the flex spline 32 and the wave generator 36. The rolling element 34 is axially received within the flex spline 32. The rolling element 34 is configured to engage an interior surface of the first portion 90, the second portion 92, and the third portion 94 of the flex spline 32. As shown in FIG. 4, the rolling element 34 is configured to engage an exterior surface of the wave generator 36. The rolling element 34 is a roller bearing that extends along an axis that is disposed parallel to the rotational axis 44.

Referring to FIGS. 2-8, the wave generator 36 is disposed about the rotational axis 44. The wave generator 36 is radially disposed between the rolling elements 34 and the motor 38. The wave generator 36 is axially received within the flex spline 32. The rolling element 34 is disposed about the wave generator 36. The wave generator 36 is disposed within the first opening 60 of the output arm 50, second opening 70 of the first ground arm 52, and the third opening 80 of the second ground arm 54.

The wave generator 36 has a body 110 that extends radially between an exterior surface 112 and an interior surface 114. The body 110 extends axially between a first face 116 and the second face 118. The body 110 of the wave generator 36 includes a land area that is configured as a generally flat region or flat area on the exterior surface 112 of the body 110. The land area extends between the first face 116 and the second face 118.

Figure 8:
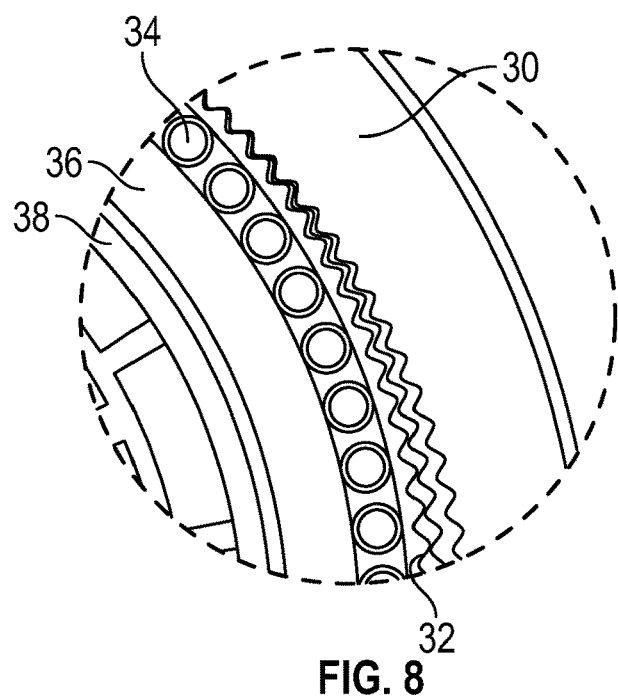
FIG. 8 is a partial perspective view of the compound harmonic drive assembly.

The exterior surface 112 has a wave profile having at least two lobes. As shown in FIG. 8, the wave profile is configured such that during rotation of the wave generator 36 about the rotational axis 44 a lobe of at least two lobes flex the flex spline 32 radially outward such that a localized portion of the first plurality of teeth 66, the second plurality of teeth 72, and the third plurality of teeth 82, respectively, meshingly engage the first plurality of meshing teeth 100, the second plurality of meshing teeth 102, and the third plurality of meshing teeth 104 and another portion of the first plurality of teeth 66, the second plurality of teeth 72 and the third plurality of teeth 82 are, respectively, spaced apart from the first plurality of meshing teeth 100, the second plurality of meshing teeth 102, and the third plurality of meshing teeth 104.

Figure 3:
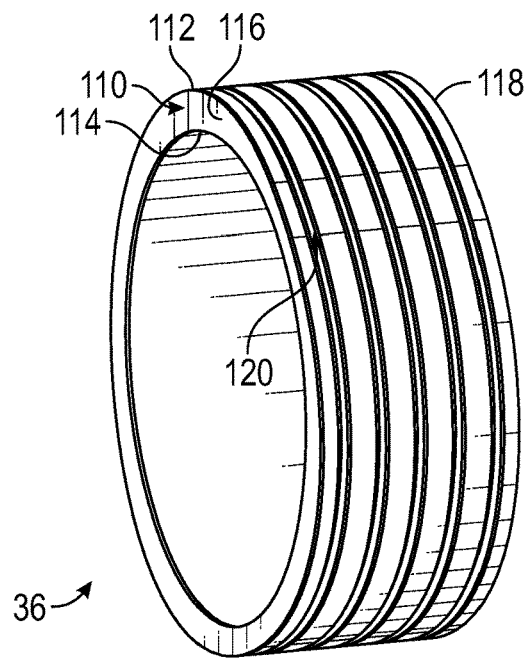
FIG. 3 is a perspective view of a wave generator of the compound harmonic drive assembly.
Figure 7:
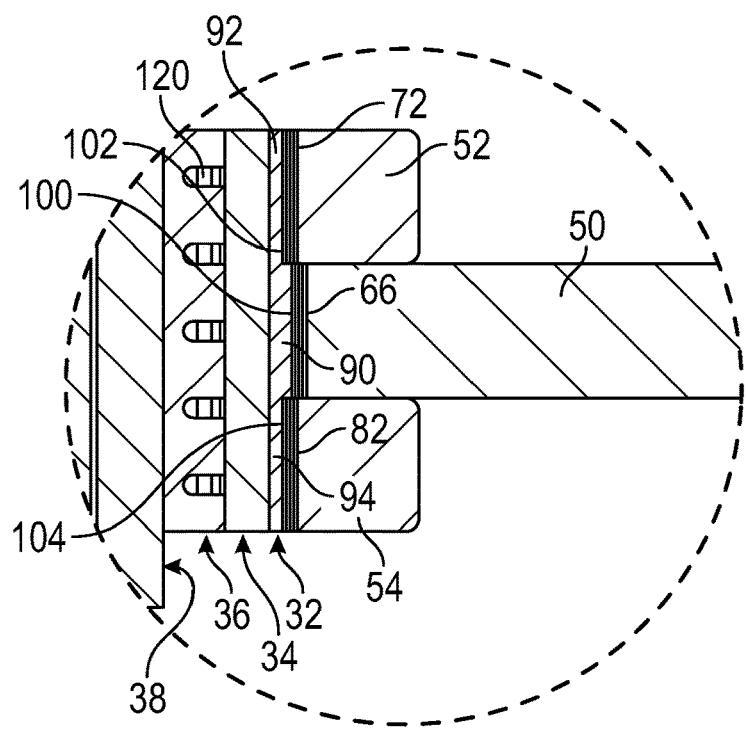
FIG. 7 is a partial side elevation view of a portion of the compound harmonic drive assembly.

The body 110 of the wave generator 36 defines at least one groove 120. The at least one groove 120 extends from the exterior surface 112 towards the interior surface 114. The at least one groove 120 extends about the body 110 and is disposed substantially transverse to the rotational axis 44. The at least one groove 120 extends through the land area of the body 110 of the wave generator 36. The at least one groove 120 is disposed substantially transverse to the axis along which the rolling element 34 extends. As shown in FIGS. 3, 6, and 7, multiple grooves are provided and are spaced apart from the first face 116 and the second face 118. The at least one groove 120 reduces the inertia of the wave generator 36. The at least one groove 120 is configured to receive a lubricant or oil such that a larger volume of oil is in contact with the rolling element 34. The circulation of the larger volume of oil increases the cooling of the rolling element 34, the wave generator 36, and the flex spline 32.

The motor 38 is drivably engaged with the wave generator 36. The motor 38 is arranged to drivably engage the interior surface 114 of the body 110 of the wave generator 36. The motor 38 is configured to spin about the rotational axis 44 to rotate the wave generator 36 to actuate or move the output arm 50 to actuate the movable control surface 14. The motor 38 is configured to rotate about the rotational axis 44 in a first direction and in a second direction disposed opposite the first direction.

The at least one groove 120 formed in the body 110 of the wave generator 36 reduces the weight of the wave generator 36 and thus reduces the inertia the wave generator 36 facilitating a faster response of the compound harmonic drive assembly 20. The at least one groove 120 formed in the body 110 of the wave generator 36 enables a faster motor response such that changes in direction and speeds of the wave generator 36 occur more quickly thus improving the response time of the compound harmonic drive assembly 20 and the flight control system 10.

Throughout this specification, the term "attach," "attachment," "connected," "coupled," "coupling," "mount," or "mounting" shall be interpreted to mean that a structural component or element is in some manner connected to or contacts another element, either directly or indirectly through at least one intervening structural element, or is integrally formed with the other structural element.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compound harmonic drive assembly, comprising:
a ring gear assembly including an output arm defining a first opening disposed about a rotational axis and having a first plurality of teeth,
a first ground arm that abuts a first side of the output arm, the first ground arm defining a second opening disposed about the rotational axis and having a second plurality of teeth, and
a second ground arm that abuts a second side of the output arm, the second ground arm defining a third opening disposed about the rotational axis and having a third plurality of teeth;
a wave generator received within the ring gear assembly along the rotational axis, the wave generator having a body that extends radially between an exterior surface and an interior surface and that extends axially between a first face and a second face, the body defining at least one groove that extends radially from the exterior surface towards the interior surface;
a flex spline disposed between the ring gear assembly and the wave generator, the flex spline includes a plurality of meshing teeth configured to engage the plurality of teeth; and
a rolling element disposed between the wave generator and the flex spline.

2. The compound harmonic drive assembly of claim 1, wherein the at least one groove extends about the body and is disposed transverse to the rotational axis.

3. The compound harmonic drive assembly of claim 2, wherein the rolling element is engages the exterior surface of the body of the wave generator.

4. The compound harmonic drive assembly of claim 3, wherein the rolling element is a roller bearing that extends along an axis that is disposed parallel to the rotational axis.

5. The compound harmonic drive assembly of claim 3, wherein the rolling element is a roller bearing that extends along an axis that is disposed transverse to the at least one groove.

6. A compound harmonic drive assembly, comprising:
a ring gear assembly including
an output arm defining a first opening disposed about a rotational axis and having a first plurality of teeth,
a first ground arm that abuts a first side of the output arm, the first ground arm defining a second opening disposed about the rotational axis and having a second plurality of teeth, and
a second ground arm that abuts a second side of the output arm, the second ground arm defining a third opening disposed about the rotational axis and having a third plurality of teeth;
a wave generator received within the first opening, the second opening, and the third opening along the rotational axis, the wave generator having a body that extends radially between an exterior surface and an interior surface and that extends axially between a first face and a second face, that defines at least one groove that extends radially from an exterior surface towards an interior surface and is disposed between the first face and the second face; and
a motor arranged to drivably engage the interior surface of the wave generator.

7. The compound harmonic drive assembly of claim 6, wherein first plurality of teeth are radially offset from the second plurality of teeth and the third plurality of teeth.

8. The compound harmonic drive assembly of claim 7, wherein the first plurality of teeth are disposed further from the rotational axis than the second plurality of teeth and the third plurality of teeth.

9. The compound harmonic drive assembly of claim 7, further comprising:
a flex spline disposed between the ring gear assembly and the wave generator, the flex spline includes a first portion having a first plurality of meshing teeth configured to meshingly engage the first plurality of teeth, a second portion having a second plurality of meshing teeth configured to meshingly engage the second plurality of teeth, and a third portion having a third plurality of meshing teeth configured to meshingly engage the third plurality of teeth.

10. The compound harmonic drive assembly of claim 9, wherein the first portion is disposed between and is radially offset from the second portion and the third portion.

11. The compound harmonic drive assembly of claim 9, wherein the at least one groove extends about the body and is disposed transverse to the rotational axis.

12. The compound harmonic drive assembly of claim 11, further comprising a rolling element disposed between the wave generator and the flex spline.

13. The compound harmonic drive assembly of claim 12, wherein the rolling element is a roller bearing that extends along an axis that is disposed transverse to the at least one groove.

14. The compound harmonic drive assembly of claim 12, wherein the output arm extends in a first direction and the first ground arm and the second ground arm extend in a second direction that is disposed opposite the first direction.

* * * * *